United States Patent
Choi et al.

(10) Patent No.: US 9,674,849 B2
(45) Date of Patent: Jun. 6, 2017

(54) METHOD AND APPARATUS FOR TRANSMITTING SIGNALS VIA MISO BROADCAST CHANNEL WITH IMPERFECT CSIT

(71) Applicants: Samsung Electronics Co., Ltd., Gyeonggi-do (KR); Imperial Innovations Limited, London (GB)

(72) Inventors: Seunghoon Choi, Gyeonggi-do (KR); Chenxi Hao, London (GB); Bruno Clerckx, London (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/027,998

(22) PCT Filed: Oct. 7, 2014

(86) PCT No.: PCT/KR2014/009436
§ 371 (c)(1),
(2) Date: Apr. 7, 2016

(87) PCT Pub. No.: WO2015/053534
PCT Pub. Date: Apr. 16, 2015

(65) Prior Publication Data
US 2016/0249369 A1    Aug. 25, 2016

Related U.S. Application Data

(60) Provisional application No. 61/887,659, filed on Oct. 7, 2013.

(51) Int. Cl.
*H04W 72/08*   (2009.01)
*H04B 7/0413*  (2017.01)
*H04B 7/06*    (2006.01)
(Continued)

(52) U.S. Cl.
CPC ........ *H04W 72/085* (2013.01); *H04B 7/0413* (2013.01); *H04B 7/0452* (2013.01);
(Continued)

(58) Field of Classification Search
CPC .......... H04B 1/02; H04B 7/04; H04B 7/0452; H04B 7/0626; H04B 7/06; H04J 1/00;
(Continued)

(56) References Cited

U.S. PATENT DOCUMENTS 8,315,643 B2 * 11/2012 Li ........................ H04L 1/0017
                                                    370/252
8,494,093 B1   7/2013 Zhang
(Continued)

FOREIGN PATENT DOCUMENTS

EP      2528290 A1      11/2012
WO  WO 2012/064998 A2    5/2012

OTHER PUBLICATIONS

International Search Report dated Jan. 14, 2015 in connection with International Patent Application No. PCT/KR2014/009436, 3 pages.
Written Opinion of the International Searching Authority dated Jan. 14, 2015 in connection with International Patent Application No. PCT/KR2014/009436, 5 pages.

*Primary Examiner* — Shawkat M Ali

(57) ABSTRACT

A system and method for transmitting signals via multi-input single-output (MISO) broadcast channel with imperfect channel state information at the transmitter (CSIT). The transmitter receives each CSI of from the plural receivers, determines a transmit power and a transmission rate based on the CSI qualities of the plural receivers calculated from the each CSI, and transmits the signal using the transmit power and the transmission rate. The signal comprises a user specific message, a first common message and a second common message to compensate imperfect CSIT.

4 Claims, 9 Drawing Sheets

(51) Int. Cl.
*H04W 52/24* (2009.01)
*H04B 7/0452* (2017.01)
*H04W 72/04* (2009.01)

(52) U.S. Cl.
CPC ......... *H04B 7/0615* (2013.01); *H04B 7/0626* (2013.01); *H04W 52/24* (2013.01); *H04W 72/0473* (2013.01)

(58) Field of Classification Search
CPC ..... H04J 3/16; H04J 3/22; H04J 11/00; H04K 1/10; H04W 24/00; H04W 252/24; H04W 72/00; H04W 72/04; H04W 72/0473; H04W 72/085; H04W 52/24; H04W 72/08
USPC ........ 370/203, 252, 328, 329; 375/260, 267, 375/295, 296; 455/101, 423
See application file for complete search history.

(56) References Cited

U.S. PATENT DOCUMENTS

| | | | |
|---|---|---|---|
| 2008/0063095 | A1 | 3/2008 | Khayraliah |
| 2008/0219369 | A1 | 9/2008 | Wu et al. |
| 2009/0213741 | A1* | 8/2009 | Wang .................... H04B 7/0452 370/252 |
| 2009/0252134 | A1* | 10/2009 | Schlicht ................ H04L 1/0015 370/338 |
| 2011/0150114 | A1* | 6/2011 | Miao .................... H04B 7/0417 375/260 |
| 2011/0159866 | A1* | 6/2011 | Kim ..................... H04B 7/0417 455/422.1 |
| 2013/0237212 | A1 | 9/2013 | Khayrallah et al. |
| 2014/0146756 | A1 | 5/2014 | Sahin et al. |

* cited by examiner

[Figure 1]
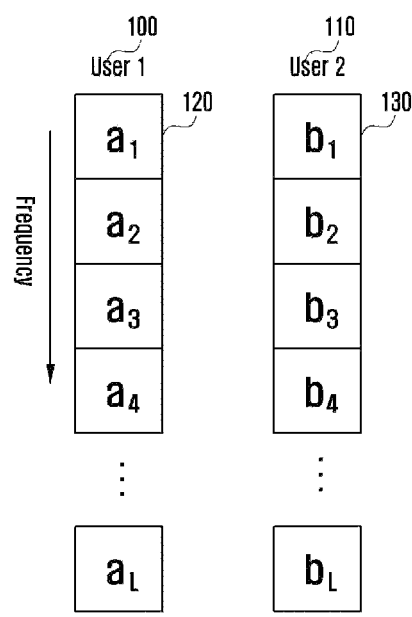

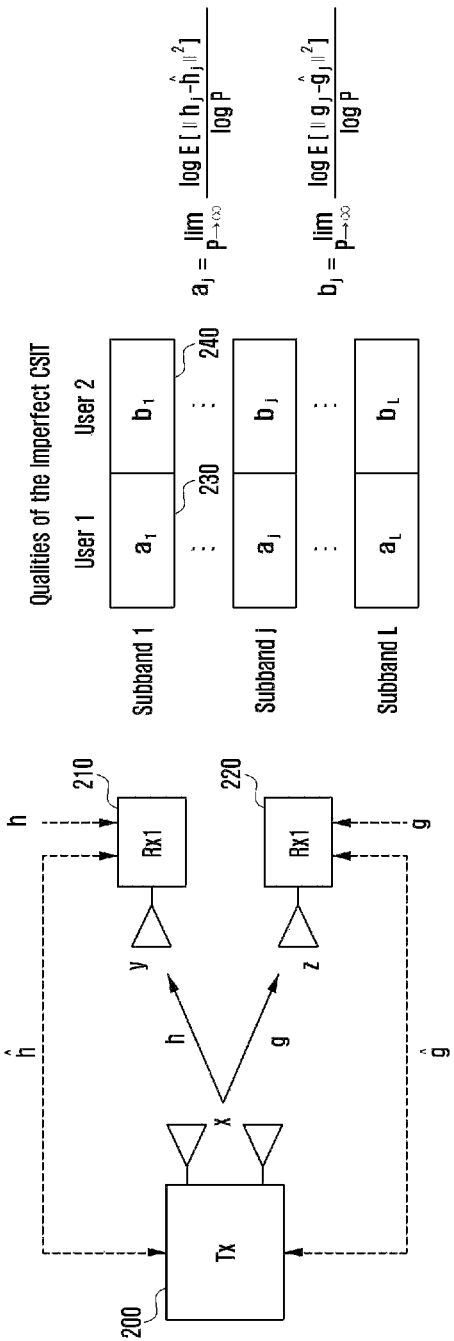
[Figure 2]

[Figure 3]
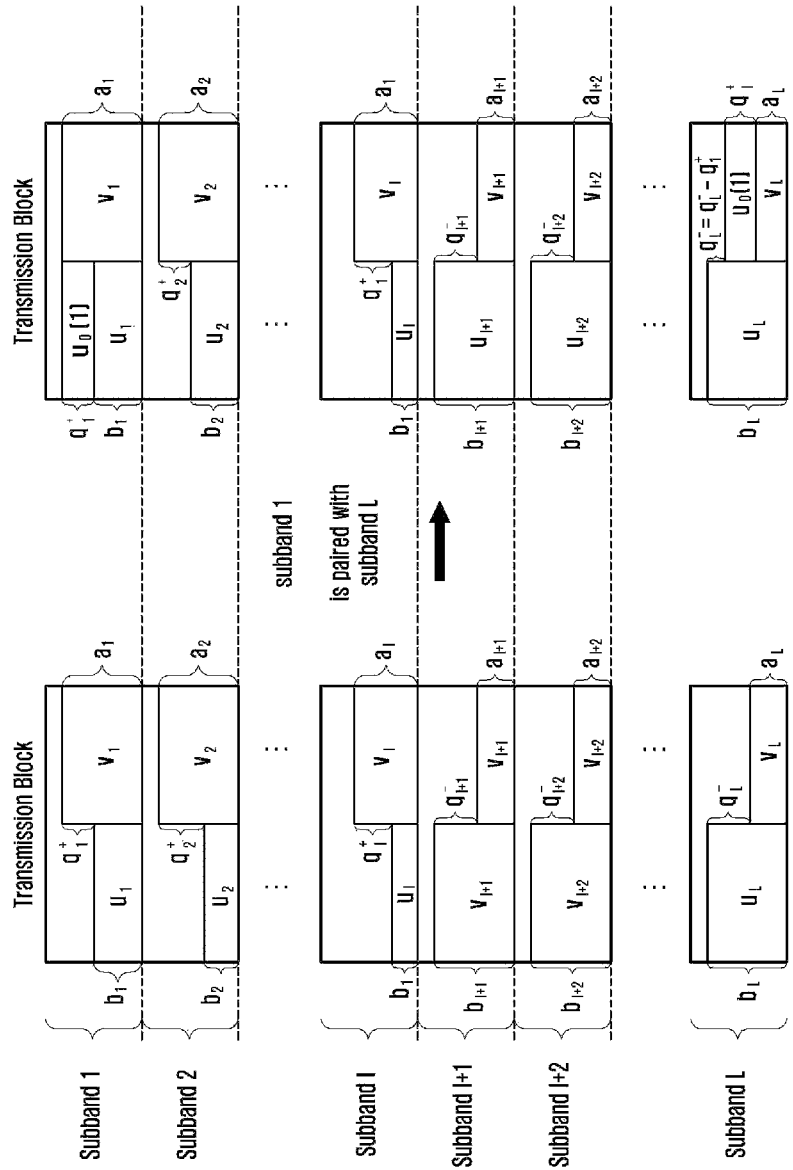

[Figure 4]
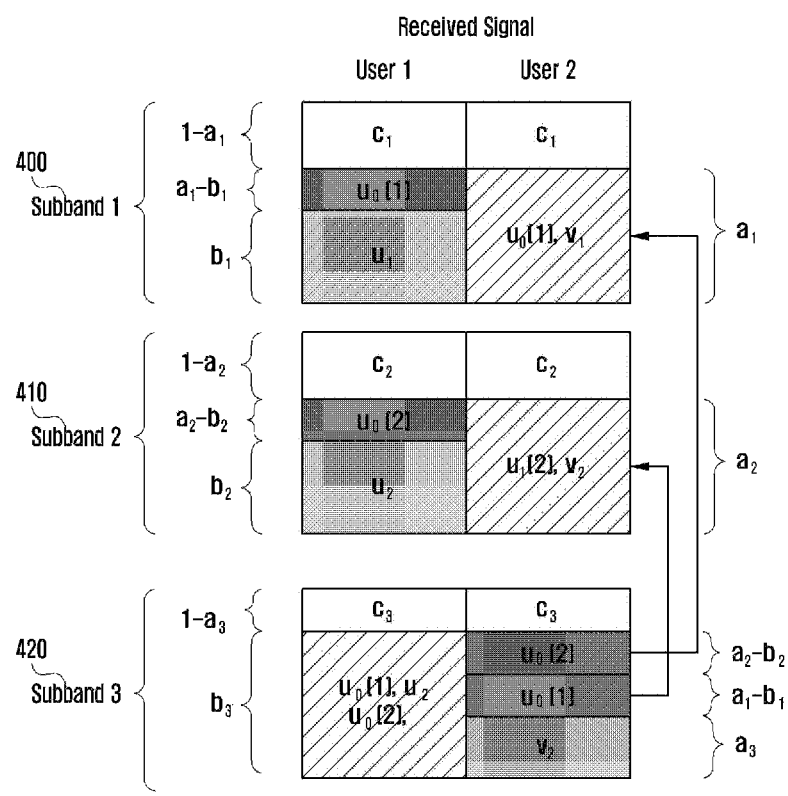

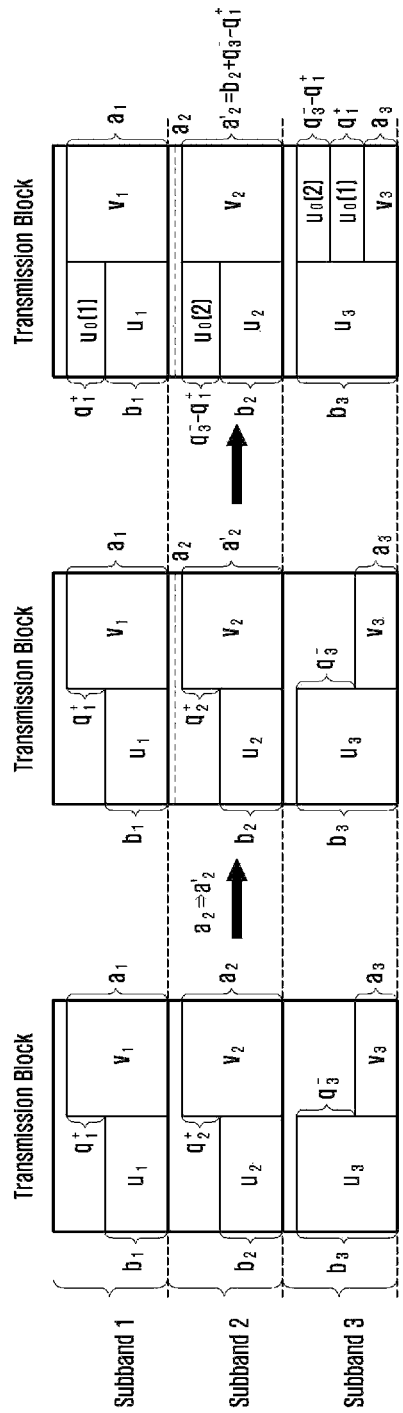
[Figure 5]

【Figure 6】
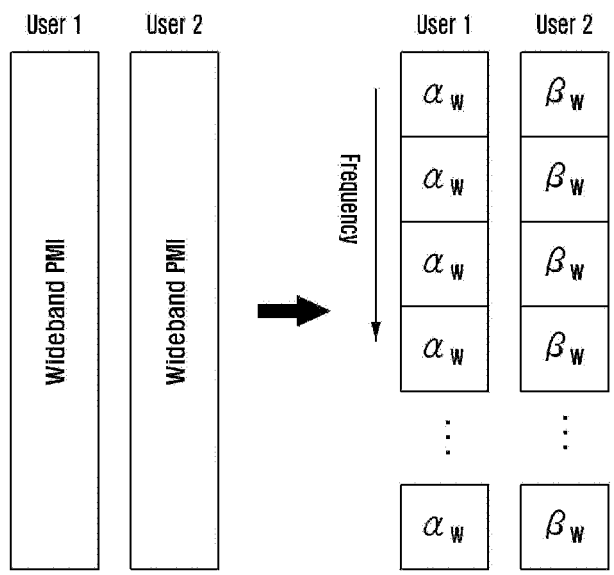
【Figure 7】
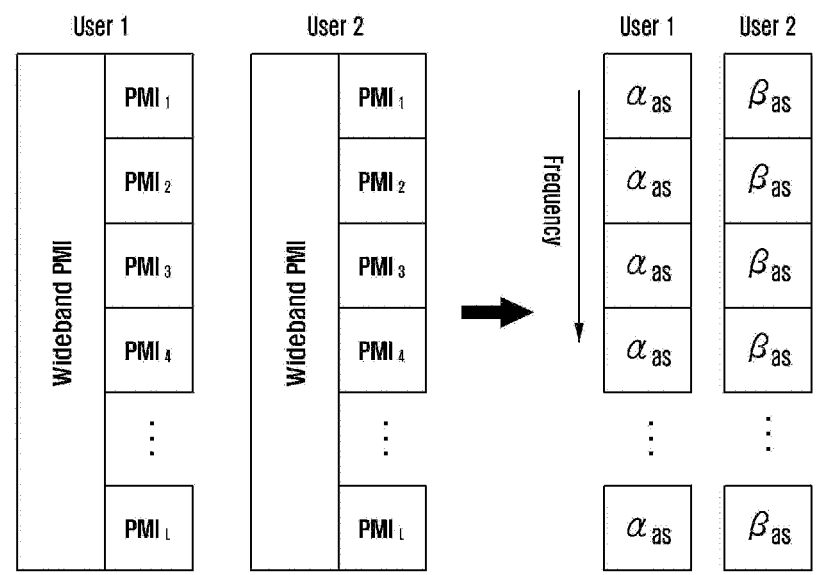

【Figure 8】
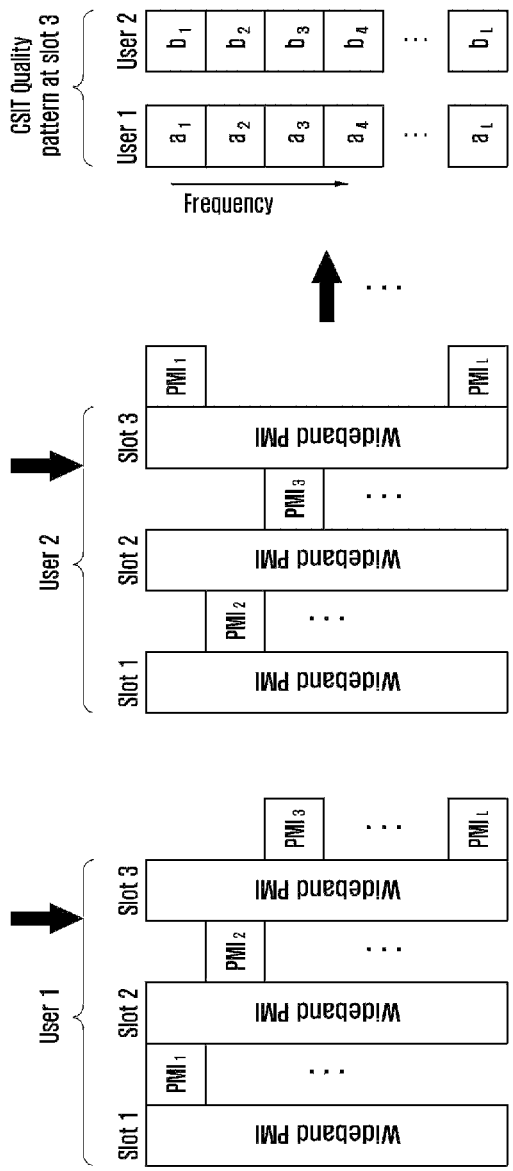

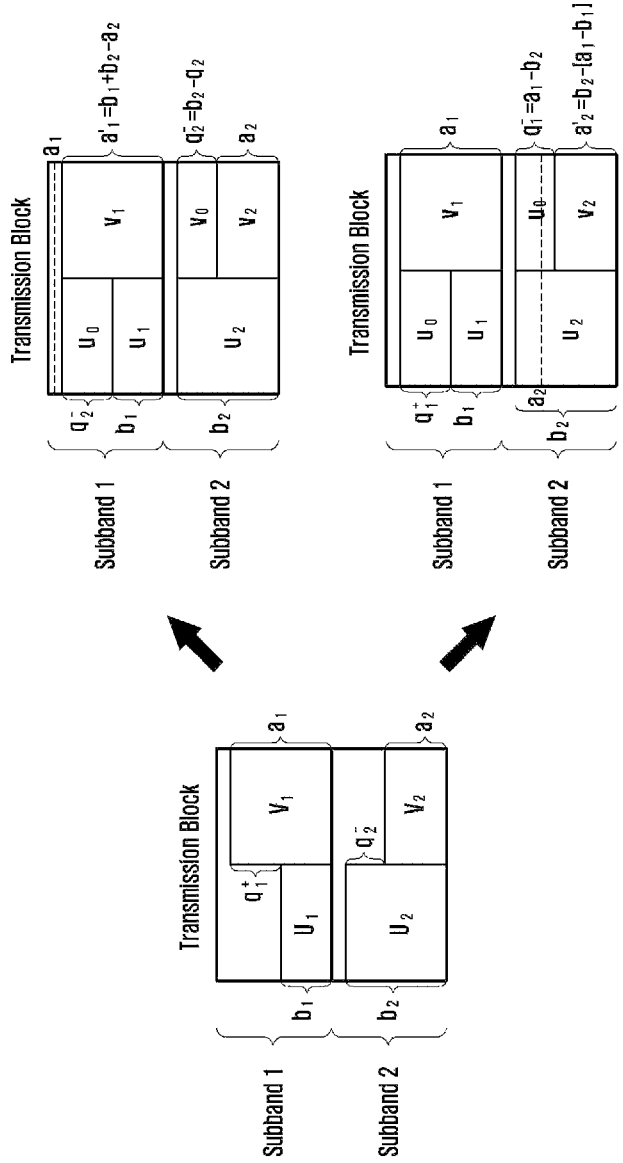
[Figure 9]

【Figure 10】
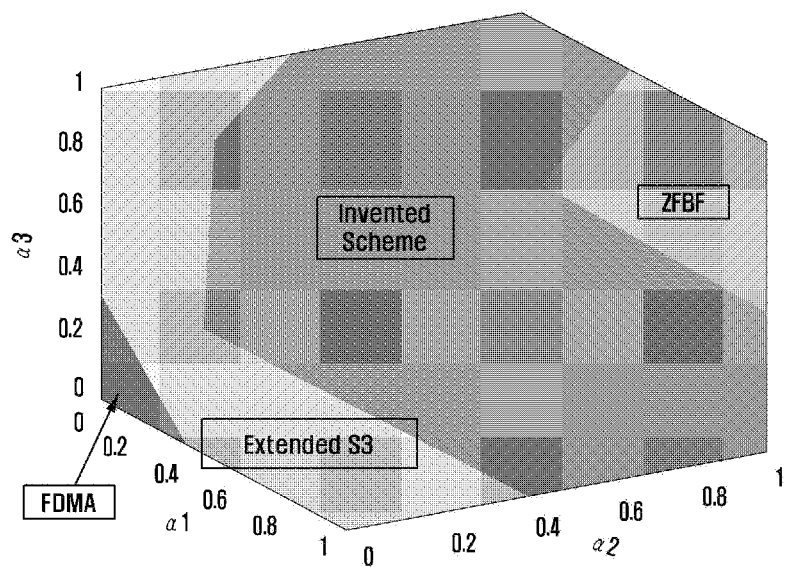
【Figure 11】
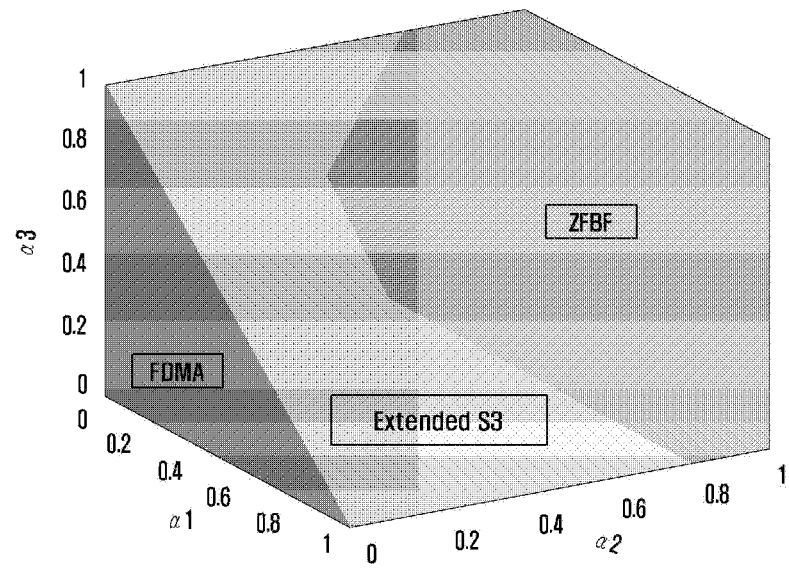
【Figure 12】
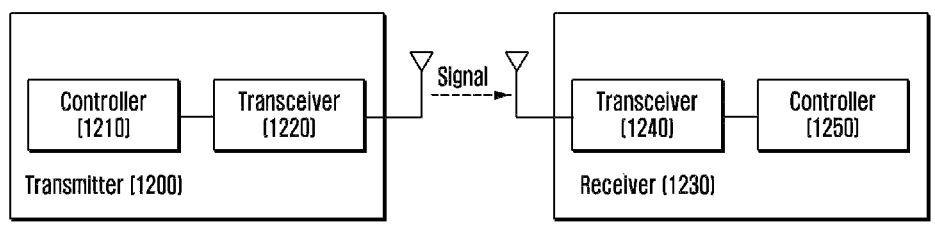

METHOD AND APPARATUS FOR TRANSMITTING SIGNALS VIA MISO BROADCAST CHANNEL WITH IMPERFECT CSIT

CROSS-REFERENCE TO RELATED APPLICATION(S)

The present application claims priority under 35 U.S.C. §365 to International Patent Application No. PCT/KR2014/009436 filed Oct. 7, 2014, entitled "METHOD AND APPARATUS FOR TRANSMITTING SIGNALS VIA MISO BROADCAST CHANNEL WITH IMPERFECT CSIT", and, through International Patent Application No. PCT/KR2014/009436, to U.S. Provisional Patent Application No. 61/887.659 filed Oct. 7, 2013, each of which are incorporated herein by reference into the present disclosure as if fully set forth herein.

TECHNICAL FIELD

The present application relates generally to wireless communication systems and, more specifically, to transmission method for multi-input single-output (MISO) broadcast channel with imperfect channel state information at the transmitter (CSIT).

BACKGROUND ART

Channel State Information at the Transmitter (CSIT) is crucial to the capacity performance and spatial multiplexing gain in downlink Broadcast Channel (BC), also called MU-MIMO, but having perfect CSIT is a challenging issue. Classically, in Frequency Division Duplexing (FDD), each user estimates their Channel State Information (CSI) in the specified subband using pilot and the estimated CSI is quantized and reported to the transmitter via a rate-limited link. In Time Division Duplexing (TDD), CSI is measured on the uplink and used in the downlink assuming channel reciprocity. Those CSI feedback mechanisms are subject to the estimation error and/or finite rate in the feedback link. Consequently, the transmitter obtains the CSI with imperfectness. Moreover, due to the frequency selectivity, constraints on uplink overhead and user distribution in the cell, the quality of CSI reported to the transmitter varies across users and subbands.

Specifically, the CSI quality patterns, formed by a user-frequency grid, can be generally illustrated as in FIG. 1. Considering an L-subband based two-user MISO-OFDMA framework, $a_j \in [0,1]$ and $b_j \in [0,1]$ respectively refer to the quality of the CSIT of user 1 100 and user 2 110 in subband j. For example, $a_1$(120) is the quality of the CSIT of user 1 in subband 1 and $b_1$(130) is the quality of the CSIT of user 2 in subband 2. "1" is equivalent to perfect CSIT as one stream/user can be successfully transmitted by simply performing Zero-Forcing Beamforming (ZFBF). "0" is equivalent to no CSIT because the imperfect CSIT cannot benefit the multiplexing gain when performing ZFBF. (More details about the definition of the quality parameters are presented in the next part.)

The performance is commonly evaluated in terms of (sum–)rate. At high SNR, the rate can be approximated by the multiplexing gain, also called Degrees-of-Freedom (DoF) hereafter. In the sequel we will look at DoF as the system performance metric. The DoF of user k writes as Math Figure 1.

MathFigure 1

$$d_k = \lim_{SNR \to \infty} \frac{R_k}{r \log_2 SNR} \qquad [\text{Math. 1}]$$

Where R_k is the rate achieved at user k in r subbands. DoF can be interpreted as the number of interference-free streams transmitted per subband at high SNR.

In such two-user BC, two fundamental transmission modes can be employed: 1) single-user transmission (one user is scheduled each time, like Frequency Division Multiple Access (FDMA)), also called SU-MIMO in LTE-Advanced, 2) conventional Multi-User MIMO (MU-MIMO) transmission (often relying on ZFBF or other filter designs like Signal to Leakage plus Noise Ratio SLNR). In FDMA (i.e, SU-MIMO), the transmitted signal in each subband only contains symbols intended for one user; In MU-MIMO (like ZFBF), the transmit signals contains message intended for several co-scheduled users. Considering a transmitter with two antennas and two users each with a single antenna, the transmitted signal in subband j with ZFBF writes as Math Figure 2.

MathFigure 2

$$x_j = \hat{g}_j^\perp u_j + \hat{h}_j^\perp v_j \qquad [\text{Math.2}]$$

Where $u_j$ and $v_j$ are symbols intended for user 1 and user 2 respectively and $\hat{g}_j$ and $\hat{h}_j$ are respectively the CSIT of user 2 and user 1.

$\hat{g}_j$ and $\hat{h}_j$ are respectively orthogonal to $\hat{g}_j$ and $\hat{h}_j$.

The received signals, denoted as $y_j$ and $z_j$ at user 1 and user 2 respectively, write as Math Figure 3.

MathFigure 3

$$y_j = h_j^H \hat{g}_j^\perp u_j + h_j^H \hat{h}_j^\perp v_j + \epsilon_{j1}$$

$$z_j = g_j^H \hat{g}_j^\perp u_j + g_j^H \hat{h}_j^\perp v_j + \epsilon_{j2} \qquad [\text{Math.3}]$$

Where $h_j$ and $g_j$ are the CSI of user 1 and user 2 respectively, $\epsilon_{j1}$ and $\epsilon_{j2}$ are additive Gaussian noise.

SU-MIMO and MU-MIMO are major transmission strategies in WiMAX, LTE and LTE-A. SU-MIMO has been introduced in LTE Rel. 8 and MU-MIMO based on DM-RS and non-codebook based precoding (like ZFBF) has been introduced in Rel. 9 and further improved in Rel. 10. The major issue with MU-MIMO in current standards is that the transmission strategy has been designed under the assumption of perfect CSI knowledge at the transmitter but is actually used in scenarios are CSI is imperfectly known at the transmitter. This leads to major performance drops.

To see the disadvantage of FDMA (SU-MIMO) and ZFBF (MU-MIMO), let us evaluate their DoF performances in the following CSIT quality patterns.

$L=1, a_1=1, a_2=1$

By performing ZFBF, each user will detect its own symbol without interference because the symbol intended for the other user is drowned by the noise. For instance, in $y_j$, the received power of $h_j^H \hat{h}_j^{\perp} v_j$ is smaller than $\epsilon_{j1}$ at high SNR. Hence, the sum DoF is 2.

By doing single-user transmission, since one user keeps silent, the active user receives one stream because each user has a single antenna. Hence, the sum DoF of 1.

$$L=1, a_1<1, b_1<1$$

By performing ZFBF, the private symbols cannot be drowned by the noise at their unintended user, thus a rate loss will incur. For instance, the received power of $h_j^H \hat{h}_j^{\perp} v_j$ in $y_j$ scales higher than $\epsilon_{j1}$ at high SNR and the rate of $u_j$ decreases. The sum DoF will be a function of the CSIT qualities, i.e. $a_1$ and $b_1$. When $a_1=b_1=0$, none of the user can decode its symbol. Hence, it is worth noting that when the CSIT is of very bad quality, performing ZFBF cannot achieve a DoF performance better than FDMA.

$$L=2, a_1=b_2=1, b_1=a_2=0$$

By performing ZFBF in each subband, user 1 can decode $u_1$ from $y_1$ and user 2 can decode $v_2$ from $z_2$. However, user 1 and user 2 cannot decode their symbols respectively in subband 2 and subband 1. This is equivalence with performing FDMA in these two subbands. Specifically, user 1 (resp. user 2) is active in subband 1 (resp. subband 2) but silent in subband 2 (resp. subband 1). Consequently, this alternating CSIT state ($a_1=b_2=1, b_1=a_2=0$) does not boost the DoF performance if ZFBF is performed.

DISCLOSURE OF INVENTION

Technical Problem

To sum, conventional MU-MIMO transmission achieves optimal DoF performance when the transmitter has perfect knowledge of the CSI of both users. However, when the CSIT is imperfect, a DoF loss is incurred if ZFBF is performed. Besides, the alternating CSIT is useless in benefiting the DoF when performing ZFBF. Hence, in order to boost the DoF making use of the imperfect and varying (or alternating) CSIT state, new transmission strategies are required.

Solution to Problem

A method for transmitting a signal based on channel state information (CSI) qualities of plural receivers, the method comprising: receiving each CSI of from the plural receivers; determining a transmit power and a transmission rate based on the CSI qualities of the plural receivers calculated from the each CSI; and transmitting the signal using the transmit power and the transmission rate.

A transmitter apparatus for transmitting a signal based on channel state information (CSI) qualities of plural receivers, the apparatus comprising: a transceiver for transmitting and receiving signals to and from the plural receivers; and a controller for receiving each CSI of from the plural receivers, for determining a transmit power and a transmission rate based on the CSI qualities of the plural receivers calculated from the each CSI, and for transmitting the signal using the transmit power and the transmission rate.

Advantageous Effects of Invention

MU-MIMO transmission achieves optimal performance when the transmitter has imperfect knowledge of the CSI of both users. Imperfect CSIT is compensated by new transmission method.

BRIEF DESCRIPTION OF DRAWINGS

FIG. 1 illustrates the CSIT quality pattern of a general L-subband based two-user MISO BC.

FIG. 2 illustrates system model of two-user MISO BC with multiple subbands and arbitrary CSIT states.

FIG. 3 illustrates the illustration of the generalization of the transmission block in an L-subband scenario with $a_e=b_e$.

FIG. 4 illustrates the illustration of the received signal and decoding procedure of the optimal scheme for the scenario with and $a_1>b_1, a_2>b_2, a_3<b_3$ and $a_1+a_2+a_3=b_1+b_2+b_3$.

FIG. 5 illustrates The illustration of the generation of the transmission block of the optimal scheme for the scenario with $$\sum_{j=1}^{3} a_j = \sum_{j=1}^{3} b_j.$$

FIG. 6 illustrates CSIT pattern with wideband PMI only.

FIG. 7 illustrates CSIT pattern with wideband PMI and all-subband PMI.

FIG. 8 illustrates The CSIT quality pattern in the scenario with selected-subband PMI and wideband PMI, where $a_4<a_1<a_2<a_3=a_L$ and $b_4<b_2<b_3<b_1=b_L$.

FIG. 9 illustrates Transferring the scenario with $a_1+a_2 \geq b_1+b_2$ to the case $a_1'+a_2' \geq b_1+b_2$.

FIG. 10 illustrates switch among FDMA, ZFBF and Extended $S_3^{3/2}$ scheme in the scenario with user-selected subband PMI and wideband PMI, targeting at achieving 90% of the optimal DoF performance.

FIG. 11 illustrates Switch among FDMA, ZFBF, and the Extended $S_3^{3/2}$ scheme in the scenario with user-selected subband PMI and wideband PMI, targeting at achieving 75% of the optimal DoF performance.

FIG. 12 illustates an example transmitter and receiver according to this invention.

$S_3^{3/2}$ scheme in the scenario with user-selected subband PMI and wideband PMI, targeting at achieving 75% of the optimal DoF performance.

MODE FOR THE INVENTION

The fundamental objective of the invention is to enhance the DoF performance in a scenario with multiple subbands and various CSIT qualities across users and subbands. Considering a transmitter with two antennas and two users each with a single antenna, the invented strategy always achieve the DoF pair $(d_1, d_2) = (1, \min(a_e, b_e))$ and $(d_1, d_2) = (a_e, b_e), 1)$, where $$a_e = \frac{1}{L} \sum_{j=1}^{L} a_j \text{ and } b_e = \frac{1}{L} \sum_{j=1}^{L} b_j$$

are respectively the average CSIT qualities of user 1 and user 2 over all the L subbands.

The following notations are used in the rest of this text. Bold lower letters stand for vectors whereas a symbol not in bold font represents a scalar. $(\cdot)^T$ and $(\cdot)^H$ represent the transpose and conjugate transpose of a matrix or vector respectively. $h^\perp$ denotes the orthogonal space of the vector h. $E[\cdot]$ refers to the expectation of a random variable, vector or matrix. $\|\cdot\|$ is the norm of a vector. $A_{j_1}^{j_2}$ refers to the set $\{A_{j_1}, A_{j_1+1}, \ldots, A_{j_2}\}$, if $j_1 \leq j_2$, otherwise $A_{j_1}^{j_2}=0$. $|A_{j_1}^{j_2}|$ represents the cardinality of the set $A_{j_1}^{j_2}$, which equals to $j_2-j_1+1$. If a is a scalar, $|a|$ is the absolute value of a. If $A_j$ is an element in the set $A=\{A_1, A_2, \ldots A_{j-1}, A_j, A_{j+1}, \ldots, A_n\}$. $A/A_j$ means removing $A_j$ from A, namely $A/A_j=\{A_1, A_2, \ldots A_{j-1}, A_{j+1}, \ldots, A_n\}$. $f(P) \sim P^B$ corresponds $$\lim_{P \to \infty} \frac{\log f(P)}{\log P} = B$$

to where P is SNR throughout the paper and logarithms are in base 2.

In the sequel, we will focus on frequency-domain MISO BC as it has strong application in current communication systems relying on MIMO-OFDMA. Nevertheless, the transmission strategies are general enough to be applied to the time domain MISO BC as well where the CSIT qualities vary across users and times instants (rather than subbands).

We also note that two transmit antennas are assumed in the explanations below but the new transmission scheme can also be applied to a larger number of antennas by using classical antenna virtualization/precoding as long as the number of co-scheduled users is still two.

Frequency Domain Two-User MISO BC

The two-user frequency domain MISO BC is shown in FIG. 2. Transmitter 200 transmits signal to receiver 210 and receiver 220. Denoting the transmitted signal as x_j, subject to the power constraint $E[\|x_j\|^2] \leq P$, the observations at user 1 and user 2, $y_j$ and $z_j$ respectively, are given by Math Figure 4.

MathFigure 4

$$y_j = h_j^H x_j + \epsilon_{j1}$$

$$z_j = g_j^H x_j + \epsilon_{j1} \qquad \text{[Math.4]}$$

where $j \in [1,L]$, $\epsilon_{j_1}$ and $\epsilon_{j_2}$ are unit power additive white Gaussian noise (AWGN). $h_j$ and $g_j$, both with unit norm, are respectively the CSI of user 1 and user 2 in subband j. The CSI are independent and identically distributed i.i.d across users and subbands.

The transmitted signal can be made up of three kinds of messages:

Common message I, denoted as $c_j$ hereafter, is broadcast to both users in subband j. They should be recovered by both users, but can be intended exclusively for user 1 or user 2;

Common message II, denoted as $u_0(\cdot)$ hereafter, should be recovered by both users, but can be intended exclusively for user or user 2. Unlike $c_j$, $u_0(\cdot)$ is broadcast twice, i.e. once in the subbands with $a_{j_1} > b_{j_1}$ (the quality of CSIT of user 1 is higher than that of user 2) and once in the subbands with $a_{j_2} < b_{j_2}$ (the quality of CSIT of user 2 is higher than that of user 1);

Private message, denoted as $u_j$ and $v_j$ subband j, are respectively intended for user 1 or user 2 only.

CSI Feedback Model

We assume a general setup (valid for both FDD and TDD) where the transmitter obtains the CSI instantaneously, but with imperfectness, due to the estimation error and/or finite rate in the feedback link Denoting $\hat{h}_j$ and $\hat{g}_j$ as the imperfect CSI of user 1 and user 2 in subband j respectively, the CSI of user 1 and user 2 can be respectively modeled as Math Figure 5.

MathFigure 5

$$h_j = \hat{h}_j + \tilde{h}_j, \quad g_j = \hat{g}_j + \tilde{g}_j \qquad \text{[Math.5]}$$

Where $\tilde{h}_j$ and $\tilde{g}_j$ are the corresponding error vectors, respectively with the covariance matrix $$E[\tilde{h}_j \tilde{h}_j^H] = \sigma_{j_1}^2 I_2$$

and $$E[\tilde{g}_j \tilde{g}_j^H] = \sigma_{j_2}^2 I_2.$$

$\hat{h}_j$ and $\hat{g}_j$ are respectively independent of $\tilde{g}_j$ and $\tilde{h}_j$.

The norm of $\hat{h}_j$ and $\hat{g}_j$ scale as $P^0$ when $P \to \infty$.

$\hat{h}_j$ and $\hat{g}_j$ are obtained by both users and the transmitter, but $h_j$ and $g_j$ are only known by user 1 and user 2 respectively.

To investigate the impact of the imperfect CSIT on the DoF performance, we assume that the variance of each entry in the error vector exponentially scales with SNR, namely $\sigma_{j_1}^2 \sim P^{-a_j}$ and $\sigma_{j_2}^2 \sim P^{-b_j}$.

$a_j$ and $b_j$ are respectively interpreted as the qualities of the CSIT of user 1 and user 2 in subband j and given as following Math Figure 6.

MathFigure 6

$$a_j = -\lim_{P \to \infty} \frac{\log \sigma_{j_1}^2}{\log P}, \quad b_j = -\lim_{P \to \infty} \frac{\log \sigma_{j_2}^2}{\log P} \qquad \text{[Math. 6]}$$

$a_j$ and $b_j$ vary within the range of [0,1]. $a_j=1$ (resp. $b_j=1$) is equivalent to perfect CSIT because the full DoF performance, i.e. $(d_1,d_2)=(1,1)$, can be achieved by simply performing ZFBF. $a_j=0$ (resp. $b_j=0$) is equivalent to no CSIT because it means that the variance of the CSI error scales as $P^0$, such that the imperfect CSIT cannot benefit the DoF when doing ZFBF. Besides, $a_j$ and $b_j$ vary across all the L subbands. It is important to note the following Math Figure 7.

MathFigure 7

$$\varepsilon\left[|h_j^H \hat{h}_j^\perp|^2\right] = \varepsilon\left[|(\hat{h}_j + \tilde{h}_j)^H \hat{h}_j^\perp|^2\right] \quad [\text{Math. 7}]$$
$$= \varepsilon\left[|\tilde{h}_j^H \hat{h}_j^\perp|^2\right]$$
$$= \varepsilon\left[\tilde{h}_j^H \hat{h}_j^\perp \hat{h}_j^{\perp H} \tilde{h}_j\right] \sim P^{-a_j}$$

As they are frequently used in the achievable schemes in Section II. Similarly, we have $$E[|g_j^H \hat{g}_j^\perp|^2] \sim P^{-b_j}.$$

Product Deployment

In practical multi-carrier wireless communication systems, like LTE, to perform closed-loop transmission, wideband and user-specific subband PMI are reported by each user. Given the PMI report mode in LTE, the scenario shown in FIG. 1 can be interpreted as the following cases Wideband PMI only: For both users, the CSIT qualities are the same among all the subbands, namely $a_{(1:L)}=\alpha_w$ for user 1 and $b_{(1:L)}=\beta_w$ for user 2.

Wideband PMI and All-Subband PMI: Similarly to the above case, the CSIT qualities are the same among all the subbands for both users, namely $a_{(1:L)}=\alpha_{as}$ for user 1 and $b_{(1:L)}=\beta_{as}$ for user 2. But $\alpha_{as} \geq \alpha_w$ and $\beta_{as} \geq \beta_w$ because of the knowledge of the all-subband PMI.

Selected-Subband PMI with/without Wideband PMI: In this case, at a given time instance, with the selected-subband PMI, the CSIT quality of each user is likely to vary across the subbands. Consequently, this report mode corresponds to the scenario with arbitrary values of $(a_j,b_j), j\in[1,L]$.

As we have seen the conventional transmission modes have limited system performance in all of these scenarios, the new transmission strategy is likely to play a role in practical system in order to enhance the capacity and spatial multiplexing gain. More details of the practical implications are provided later.

Invented Transmission Strategy

In this section, we will first provide the invented scheme for the general L-subband scenario where the average CSIT quality of user 1 is the same as that of user 2, namely $a_e=b_e$. The DoF performance is enhanced compared to the state of the art. Secondly, for the scenario with $a_e \neq b_e$, we show that the transmission blocks are constructed in the same way as the case with $a_e=b_e$. Finally, the key idea inside the construction of the invented scheme is summarized.

L-Subband Scenario with $a_e=b_e$

In this section, we consider the L-subband scenario with $$\sum_{j=1}^{L} a_j = \sum_{j=1}^{L} b_j.$$

For convenience, we denote the difference between the CSIT qualities of the two users in subband j as $$q_j^+ := a_j - b_j$$

q if $a_j > b_j$ while $$q_j^- := b_j - a_j$$

if $a_j < b_j$. Without the loss of generality, we consider $a_j \geq b_j$ in subband 1 to l and $a_j \leq b_j$ in the remaining subbands. Then, we denote the set formed by $q_j^+$ as $\{q^+\}$ and the set formed by $q_j^-$ as $\{q^-\}$.

Construction of the Transmission Block

The procedure of generating the transmission block is sketched below.

a. In each subband, generate the private symbols $u_j$ and $v_j$ respectively with the power $P^{b_j}$ and $P^{a_j}$ and rate $b_j \log P$ and $a_j \log P$ and transmit them via ZFBF precoding;

b. $i \leftarrow 1$; If $\{q^+\}$ or $\{q^-\}$ is empty, goto Step g, otherwise goto Step c;

c. Arbitrarily pair subband $j_1 \in [1,l]$ and subband $j_2 \in [l+1, L]$, if $q_{j_1}^+ \in q^+$ and $q_{j_2}^- \in q^-$;

d. Generate common message II, $u_0(i)$, with rate $\min(q_{j_1}^+, q_{j_2}^-) \log P$ and transmit it both in subband $j_1$ and $j_2$ using Superposition Coding (SC);

e. If $q_{j_1}^+ < q_{j_2}^-$, update)

$q_{j_2}^- \leftarrow q_{j_2}^- - q_{j_1}^+$ and $\{q^+\} \leftarrow \{q^+\}/q_{j_1}^+$;

Else if $q_{j_1}^+ > q_{j_2}^-$, update $q_{j_1}^+ \leftarrow q_{j_1}^+ - q_{j_2}^-$ and $\{q^-\} \leftarrow \{q^-\}/q_{j_2}^-$;

Else if $q_{j_1}^+ = q_{j_2}^-$, update $\{q^+\} \leftarrow \{q^+\}/q_{j_1}^+$ and $\{q^-\} \leftarrow \{q^-\}/q_{j_2}^-$;

f. $i \leftarrow i+1$; If $\{q^+\}$ or $\{q^-\}$ is empty, goto Step g, otherwise, repeat from Step c;

g. For the subbands with $a_j<1$ and $b_j<1$, generate common message I, $c_j$ with rate $(1-\max(a_j,b_j))\log P$ and power $P - P^{\max(a_j,b_j)}$.

FIG. 3 illustrates the generation of the transmission block for the L-subband scenario with $a_e=b_e$. As shown in FIG. 3, the private symbols are generated following Step a. After that, subband 1 and subband L are paired as in Step c, in each of which common message II, $u_0(1)$, is generated and transmitted with rate $q_1^+ \log P$ following Step d. The set $\{q^+\}$ therefore becomes $\{q_2^+, q_3^+, \ldots, q_l^+\}$ while $\{q^-\}$ becomes $\{q_{l+1}^-, q_{l+2}^-, \ldots, q_{L-1}^-, q_L^- - q_1^+\}$ according to Step e.

Keep generating $u_0(i)$ messages following Step c to e, we will eventually have the transmitted signal in each subband as a superposition of ZFBF-precoded private symbols, multiple common messages II and a single common message I. It generally writes as Math Figure 8.

MathFigure 8

$$x_j = [c_j, 0]^T + \hat{g}_j^\perp u_j + \hat{h}_j^\perp v_j + \left[\sum_{i=1}^{K_j = |\mathcal{K}_j|} u_0(\mathcal{K}_j(i)), 0\right]^T \quad \text{[Math. 8]}$$

where
$\mathcal{K}_j$,
with the cardinality $K_j$, is the set of the
$u_0(\cdot)$
symbols to be sent in subband j.
$u_0(\mathcal{K}_j(i))$, $i=1,2,\ldots,K_j$,
is the ith common message II to be sent in subband j. The power and rate allocation in subband $j\in[1,l]$ (where $a_j \geq b_j$) are presented in Table 1, where $\tau_j(i)$ and
$(P^{a_j - \Sigma_{i'=1}^{i-1}\tau_j(i')} - P^{a_j - \Sigma_{i'=1}^{i}\tau_j(i')})/2$
r respectively represent the pre-log factor of the rate and the power of
$u_0(\mathcal{K}(i))$.
Also, we have
$P^{a_j - \Sigma_{i=1}^{K_j}\tau_j(i)} = P^{b_j}$,
namely
$\Sigma_{i=1}^{K_j}\tau_j(i) = a_j - b_j$,
such that all the common messages II in the set $\mathcal{K}_j$ can be recovered by user 1.

TABLE 1

| | Power | Rate (logP) |
|---|---|---|
| $c_j$ | $P - P^{a_j}$ | $1 - a_j$ |
| $u_j$ | $P^{b_j}/2$ | $b_j$ |
| $v_j$ | $P^{a_j}/2$ | $a_j$ |
| $u_0(\mathcal{K}_j(1))$ | $(P^{a_j} - P^{a_j - \tau_j(1)})/2$ | $\tau_j(1)$ |
| $u_0(\mathcal{K}_j(2))$ | $(P^{a_j - \tau_j(1)} - P^{a_j - \tau_j(1) - \tau_j(2)})/2$ | $\tau_j(2)$ |
| ⋮ | ⋮ | ⋮ |
| $u_0(\mathcal{K}_j(K_j))$ | $\left(P^{a_j - \Sigma_{i=1}^{K_j-1}\tau_j(i)} - P^{a_j - \Sigma_{i=1}^{K_j}\tau_j(i)}\right)/2$ | $\tau_j(K_j)$ |

The signal received at each receiver in subband $j\in[1,l]$ is expressed as Math Figure 9.

MathFigure 9

$$y_j = \underbrace{h_{j1}^* c_j}_{P} + \underbrace{h_j^H \hat{g}_j^\perp u_j}_{P^{b_j}} + \underbrace{h_j^H \hat{h}_j^\perp v_j}_{P^0} + \quad \text{[Math. 9]}$$

$$h_{j1}^*\left(\frac{u_0(\mathcal{K}_j(1))}{P^{a_j}} + \frac{u_0(\mathcal{K}_j(2))}{P^{a_j - \tau_j(1)}} + \ldots + \frac{u_0(\mathcal{K}_j(K_j))}{P^{a_j - \Sigma_{k=1}^{K_j-1}\tau_j(k)}}\right) + \epsilon_{j1}$$

$$z_j = \underbrace{g_{j1}^* c_j}_{P} + \underbrace{g_j^H \hat{g}_j^\perp u_j}_{P^0} + \underbrace{g_j^H \hat{h}_j^\perp v_j}_{P^{a_j}} +$$

$$g_{j1}^*\left(\frac{u_0(\mathcal{K}_j(1))}{P^{a_j}} + \frac{u_0(\mathcal{K}_j(2))}{P^{a_j - \tau_j(1)}} + \ldots + \frac{u_0(\mathcal{K}_j(K_j))}{P^{a_j - \Sigma_{k=1}^{K_j-1}\tau_j(k)}}\right) + \epsilon_{j2}$$

Decoding (using Successive Interference Cancellation (SIC)): At both users, $c_j$ can be decoded first by treating all the other terms as noise in subband j. After removing $c_j$, user 1 sees
$u_0(\mathcal{K}_j(i))$, $i=1,2,\ldots,K_j$,
with different power levels and decodes them using SIC. Specifically,
$u_0(\mathcal{K}_j(i))$, $i<K_j$,
is decoded with the SNR as Math Figure 10.

MathFigure 10

$$SNR_{u_0(\mathcal{K}_j(i))} \approx \frac{P^{a_j - \Sigma_{i'=1}^{i-1}\tau_j(i')}}{P^{a_j - \Sigma_{i'=1}^{i}\tau_j(i')}} = P^{\tau_j(i)}, \text{ when } P \to \infty \quad \text{[Math. 10]}$$

By treating $u_j$ as noise,
$u_0(\mathcal{K}_j(K_j))$
is recovered with the SNR as Math Figure 11.

MathFigure 11

$$SNR_{u_0(\mathcal{K}_j(K_j))} \approx \frac{P^{a_j - \Sigma_{i'=1}^{K_j - 1}\tau_j(i')}}{P^{b_j}} = \quad \text{[Math. 11]}$$

$$P^{a_j - \Sigma_{i'=1}^{K_j - 1}\tau_j(i') - b_j} = P^{\tau_j(K_j)}$$

since
$\Sigma_{i=1}^{K_j}\tau_j(i) = a_j - b_j$.
After removing
$u_0(\mathcal{K}_j(i))$,
$i=1,2,\ldots,K_j$ from $y_j$, user 1 recovers $u_j$ subject to noise.
Performing the same decoding procedure for subbands 1 to l (with $a_j \geq b_j$), user 1 can recover every
$u_0(\cdot)$
symbol. However in the subbands l+1 to L (with $a_j \leq b_j$), user 1 sees
$u_0(\cdot)$
messages and $u_j$ with the same power level. Since every
$u_0(\cdot)$
symbol is recovered from $y_1$ to $y_l$, the private symbols intended for user 1 in subbands l+1 to L are recovered with the knowledge of all the
$u_0(\cdot)$
symbols. User 2 can decode
$u_0(\cdot)$
messages and its private messages similarly.
The sum rate achieved by the private symbols, $u_j$, intended for user 1 is $$\sum_{j=1}^{L} b_j \log P.$$

The private symbols $v_j$ intended for user 2 achieve the same rate as $$\sum_{j=1}^{L} a_j \log P.$$

Besides, the common messages $c_j$ achieve sum rate $$\left(L - \sum_{j_1=1}^{l} a_{j_1} - \sum_{j_2=l+1}^{L} b_{j_2}\right)\log P.$$

Combined with the sum rate of the $u_0(\cdot)$ symbols $$\sum_{j=1}^{l} q_j^+ \log P,$$

the sum rate of all the symbols is $$\left(L + \sum_{j=1}^{l} a_{j_1}\right)\log P.$$

If all the common messages (i.e. $u_0(\cdot)$ symbols and $c_j$) are intended for user 1, the DoF pair $$\left(1, \frac{1}{L}\sum_{j=1}^{L} a_j\right)$$

is achieved.

A 3-subband example

Here, we provide a 3-subband scenario, where $a_1 > b_1$, $a_2 > b_2$, $a_3 < b_3$ and $a_1 + a_2 + a_3 = b_1 + b_2 + b_3$. Following the procedure discussed before, the transmitted signal is constructed as follows:

a. In each subband, $u_j$ (resp. $v_j$) is generated with rate $b_j$ log P (resp. $a_j$ log P) and precoded by $\widehat{g}_j^\perp$ (resp. by $\widehat{h}_j^\perp$).
The power allocated to $u_j$ (resp. $v_j$) is $P^{b_j}/2$ (resp. $P^{a_j}/2$);

b. For subband 1 and subband 3, common message II, $u_0(1)$, is generated with rate
$q_1^+ \log P = (a_1 - b_1)\log P$
and transmitted through one antenna in both subbands. $u_0(1)$ is allocated with power
$(P^{b_1+q_1^+} - P^{b_1})/2 = (P^{a_1} - P^{b_1})$
in subband 1 and with power
$(P^{b_3+q_2^+} - P^{a_3})/2$
in subband 3;

c. For subband 2 and 3, the second common message II, $u_0(2)$, is generated with rate
$q_2^+ \log P = (a_2 - b_2)\log P$
and transmitted through one antenna in both subbands. $u_0(2)$ is allocated with power
$(P^{b_2+q_2^+} - P^{b_2})/2 = (P^{a_2} - P^{B_2})$
in subband 2 and with power
$(P^{b_3} - P^{b_3-q_2^+})/2$
in subband 3.

d. In each subband, common message I, $c_j$ is generated with rate $(1-\max(a_j,b_j))\log P$ and transmitted through one antenna with power
$P - P^{\max(a_j,b_j)}$.

Consequently, the transmitted signals write as Math Figure 12 with the power and rate allocation given in Table 2.

MathFigure 12

$$x_1 = [c_1, 0]^T + \hat{g}_1^\perp u_1 + [u_0(1), 0]^T + \hat{h}_1^\perp v_1$$

$$x_2 = [c_2, 0]^T + \hat{g}_2^\perp u_2 + [u_0(2), 0]^T + \hat{h}_2^\perp v_2$$

$$x_3 = [c_3, 0]^T + \hat{h}_3^\perp v_3 + [u_0(2) + u_0(1), 0]^T + \hat{g}_2^\perp u_3 \quad [\text{Math.12}]$$

TABLE 2

|  | Power | Rate (logP) |  | Power | Rate (logP) |  | Power | Rate (logP) |
| --- | --- | --- | --- | --- | --- | --- | --- | --- |
| $c_1$ | $P - P^{a_1}$ | $1 - a_1$ | $c_2$ | $P - P^{a_2}$ | $1 - a_2$ | $c_3$ | $P - P^{b_3}$ | $1 - b_3$ |
| $u_1$ | $P^{b_1}/2$ | $b_1$ | $u_2$ | $P^{b_2}/2$ | $b_2$ | $v_3$ | $P^{a_3}/2$ | $a_3$ |
| $v_1$ | $P^{a_1}/2$ | $a_1$ | $v_2$ | $P^{a_2}/2$ | $a_2$ | $u_3$ | $P^{b_3}/2$ | $b_3$ |
| $u_0(1)$ | $P^{a_1}/2 - P^{b_1}/2$ | $a_1 - b_1$ | $u_0(2)$ | $P^{a_2}/2 - P^{b_2}/2$ | $a_2 - b_2$ | $u_0(1)$ | $P^{b_3-q_2^+}/2 - P^{a_3}/2$ | $q_1^+$ |
|  |  |  |  |  |  | $u_0(2)$ | $P^{b_3}/2 - P^{b_3-q_2^+}/2$ | $q_2^+$ |

The received signals are expressed as Math Figure 13.

MathFigure 13

$$y_1 = \underbrace{h_{11}^* c_1}_{P} + \underbrace{h_1^H \hat{g}_1^\perp u_1}_{P^{b_1}} + \underbrace{h_{11}^* u_0(1)}_{P^{a_1}} + \underbrace{h_1^H \hat{h}_1^\perp v_1}_{P^0} + \epsilon_{11} \quad [\text{Math. 13}]$$

$$z_1 = \underbrace{g_{11}^* c_1}_{P} + \underbrace{g_1^H \hat{g}_1^\perp u_1}_{P^0} + \underbrace{g_{11}^* u_0(1)}_{P^{a_1}} + \underbrace{g_1^H \hat{h}_1^\perp v_1}_{P^{a_1}} + \epsilon_{12}$$

$$y_2 = \underbrace{h_{21}^* c_2}_{P} + \underbrace{h_2^H \hat{g}_2^\perp u_2}_{P^{b_2}} + \underbrace{h_{21}^* u_0(2)}_{P^{a_2}} + \underbrace{h_2^H \hat{h}_2^\perp v_2}_{P^0} + \epsilon_{21}$$

$$z_2 = \underbrace{g_{21}^* c_2}_{P} + \underbrace{g_2^H \hat{g}_2^\perp u_2}_{P^0} + \underbrace{g_{21}^* u_0(2)}_{P^{a_2}} + \underbrace{g_2^H \hat{h}_2^\perp v_2}_{P^{a_2}} + \epsilon_{22}$$

$$y_3 = \underbrace{h_{31}^* c_3}_{P} + \underbrace{h_3^H \hat{h}_3^\perp v_3}_{P^0} + \underbrace{h_{31}^* (u_0(2) + u_0(1))}_{P^{b_3} \ P^{b_3-q_2^+}} + \underbrace{h_3^H \hat{g}_3^\perp u_3}_{P^{b_3}} + \epsilon_{31}$$

$$z_3 = \underbrace{g_{31}^* c_3}_{P} + \underbrace{g_3^H \hat{h}_3^\perp v_3}_{P^{a_3}} + \underbrace{g_{31}^* (u_0(2) + u_0(1))}_{P^{b_3} \ P^{b_3-q_2^+}} + \underbrace{g_3^H \hat{g}_3^\perp u_3}_{P^0} + \epsilon_{32}$$

FIG. 4 describes the decoding procedure. At both users, the common messages I, $c_1$, $c_2$ and $c_3$ are respectively decoded from the observation in subband 1(400), 2(410) and 3(420). The values beside the bracket stand for the (pre-log factor of the) rate of the corresponding symbols. Two common messages II, $u_0(1)$ and $u_0(2)$ are transmitted. User 1 decodes them in subband 1 and 2 respectively. User 2 recovers them using SIC in subband 3. After that, at user 1, $u_0(1)$ and $u_0(2)$ are respectively decoded from $y_1$ and $y_2$ by treating $u_1$ and $u_2$ as noise, since $a_1$ and $a_2$ are respectively greater than $b_1$ and $b_2$. With the knowledge of $u_0(1)$ and $u_0(2)$, the private symbols $u_1$, $u_2$ and $u_3$ are obtained from $y_1$, $y_2$ and $y_3$ respectively using SIC. At user 2, by treating $u_0(1)$ and $v_3$ as noise, $u_0(2)$ is decoded from $z_3$ with the SNR as Math Figure 14.

MathFigure 14

$$SNR_{u_0(2)} \approx \frac{P^{b_3}}{P^{b_3-q_2^+}} = P^{q_2^+} = P^{a_2-b_2}, \text{ when } P \to \infty \qquad \text{[Math. 14]}$$

Removing $u_0(2)$ and treating $v_3$ as noise, $u_0(1)$ is decoded with the SNR as Math Figure 15.

MathFigure 15

$$SNR_{u_0(1)} \approx \frac{P^{b_3-q_2^+}}{P^{a_3}} = P^{b_3-q_2^+-a_3} = P^{q_1^+} = P^{a_1-b_1},$$

when $P \to \infty$

With the knowledge of $u_0(1)$ and $u_0(2)$, the private symbols $v_1$, $v_2$ and $v_3$ can be decoded from $z_1$, $z_2$ and $z_3$ respectively using SIC.

FIG. 4 illustrates the illustration of the received signal and decoding procedure of the optimal scheme for the scenario with
$a_1>b_1$, $a_2>b_2$, $a_3<b_3$, $a_1+a_2+a_3=b_1+b_2+b_3$.

The private symbols $u_1$, $u_2$ and $u_3$ intended for user 1 achieve the sum rate $(b_1+b_2+b_3)\log P$, so do the private symbols $v_1$, $v_2$ and $v_3$ for user 2 since $a_1+a_2+a_3=b_1+b_2+b_3$.

The DoF pair $$\left(1, \frac{1}{3}\sum_{j=1}^{3} a_j\right)$$

and $$\left(\frac{1}{3}\sum_{j=1}^{3} a_j, 1\right)$$

are achieved considering that the common messages intended for user 1 and user 2 respectively.

L-subband Scenario with $a_e \neq b_e$

Without the loss of generality, we consider the scenario with $a_1, a_2, \ldots, a_L$ and $b_1, b_2, \ldots, b_L$ and $$\sum_{j=1}^{L} a_j = \sum_{j=1}^{L} b_j.$$

To design the transmission strategy achieving the DoF pair $$\left(1, \frac{1}{L}\sum_{j=1}^{L} b_j\right)$$

and $$\left(\frac{1}{L}\sum_{j=1}^{L} b_j, 1\right),$$

we can find an equivalent CSIT pattern, $a_1', a_2', \ldots, a_L'$ and $b_1, b_2, \ldots, b_L$, such that Math Figure 16.

MathFigure 16

$$\sum_{j=1}^{L} a_j' = \sum_{j=1}^{L} b_j, \text{ and } a_j' \leq a_j, \forall j \in [1, L] \qquad \text{[Math. 16]}$$

Afterwards, the transmission block can be constructed in the same way as that discussed before.

FIG. 5 illustrates The illustration of the generation of the transmission block of the optimal scheme for the scenario with $$\sum_{j=1}^{3} a_j > \sum_{j=1}^{3} b_j.$$

As shown in FIG. 5, let us consider a 3-subband scenario with
$a_1>b_1$, $a_2>b_2$, $a_3<b_3$, $a_1+a_2+a_3>b_1+b_2+b_3$
(namely,
$q_1^+ + q_2^+ > q_3^-$).
The procedure of generating the transmission block is shown in FIG. 6. We keep $a_1'=a_1$ and $a_3'=a_3$ (denoted as $a_1$ and $a_3$ for convenience), but replace $a_2$ with $a_2'=b_1+b_2+b_3-a_1-a_3$ (assuming $a_2'>0$) and
$q_2^+$
is substituted with
$q_2^{+'} = a_2' - b_2 = q_3^- - q_1^+$
(assuming
$q_2^{+'}>0$).
Then, following the footsteps given before, similar transmitted signals with that are resulted and write as Math Figure 17.

MathFigure 17

$$x_1 = \underbrace{[c_1, 0]^T}_{P-P^{a_1}} + \underbrace{\hat{g}_1^\perp u_1}_{P^{b_1}/2} + \underbrace{[u_0(1), 0]^T}_{(P^{a_1}-P^{b_1})/2} + \underbrace{\hat{h}_1^\perp v_1}_{P^{a_1}/2} \qquad \text{[Math. 17]}$$

$$x_2 = \underbrace{[c_2, 0]^T}_{P-P^{a_2'}} + \underbrace{\hat{g}_2^\perp u_2}_{P^{b_2}/2} + \underbrace{[u_0(2), 0]^T}_{(P^{a_2'}-P^{b_2})/2} + \underbrace{\hat{h}_2^\perp v_2}_{P^{a_2'}/2}$$

$$x_3 = \underbrace{[c_3, 0]^T}_{P-P^{b_3}} + \underbrace{\hat{g}_3^\perp u_3}_{P^{b_3}/2} +$$

$$\underbrace{[u_0(2), 0]^T}_{(P^{b_3}-P^{b_3}-q_3^-+q_1^+)/2} + \underbrace{[u_0(1), 0]^T}_{(P^{b_3}-q_3^-+q_1^+-P^{a_3})/2} + \underbrace{\hat{h}_3^\perp v_3}_{P^{a_3}/2}$$

Reusing the decoding procedure discussed in Section 2.A.i and 2.A.ii, the DoF pairs $$\left(1, \frac{1}{3}\sum_{j=1}^{3} b_j\right)$$

and $$\left(\frac{1}{3}\sum_{j=1}^{3} b_j, 1\right)$$

are achieved.

Core Ingredients of the Invention

Here, we highlight the core ingredients in the L-subband transmission strategy as:

The invented scheme can be applied to any two-user MISO BC with general CSIT quality patterns in L channels. The "channels" can be subbands in frequency or slots in time domain. The number of transmit antennas can be large. The CSIT qualities of user 1, $a_{(1:L)}$, and that of user 2, $b_{(1:L)}$, can be any values within the range of 0 and 1, besides the per-user average CSIT can be equal or unequal for the two users;

For the scenario with different per-user average CSIT quality (for instance $a_e > b_e$), the transmission scheme is designed similarly as the equivalent scenario with equal per-user average CSIT quality (namely, $a_1'$, $a_2'$, ..., $a_L'$ and $b_1, b_2, \ldots, b_L$, such that $$\sum_{j=1}^{L} a_j' > \sum_{j=1}^{L} b_j,$$

The invented scheme makes use of the varying CSIT qualities of the two users among all the subbands $(a_j, b_j)$, j=1:L, by generating and transmitting multiple common messages II, namely
$u_0(\cdot)$,
common message I, namely $c_j$ and private symbols, namely $u_j$ and $v_j$.

The common messages II are divided into groups, each group corresponds to the common messages II to be sent in a particular subband, namely the set
$u_0(\mathcal{K}_j(i))$, i=1, 2, ..., $K_j$
in subband j; The common messages II in each group are superposed together using any suitable techniques.

The way of grouping all the common messages II should follow the CSIT quality pattern, such that each user can decode the common messages II in the subbands where it has a higher CSIT quality. For instance, we assume
$a_{j_1} > b_{j_1}$
for $j_1$=1:1 and user 1 decodes all the common messages II from these 1 subbands. Hence, the common messages II should be divided into 1 groups. Besides, the sum rate of the common messages II sent in subband $j_1$ scales as
$(a_{j_1} - b_{j_1}) \log P$.
Similarly, we assume
$a_{j_2} < b_{j_2}$
for $j_2$=1+1:L and user 2 decodes all the common messages II from these L−1 subbands. All the common messages II should be divided into L−1 groups, the sum rate of the common messages II sent in subband $j_2$ scales as
$(b_{j_2} - a_{j_2}) \log P$.

The power and rate allocated to the every common messages II is a function of the CSIT quality patterns. The sum rate of them scales as $$\sum_{a_j > b_j} (a_j - b_j) \log P.$$

Each common message II can be precoded and sent from multiple antennas OR non-precoded sent through a single antenna.

In each subband, generate and transmit the private symbols using ZFBF. The power and rate allocated to the private symbols are subject to the CSIT quality of the unintended user in order not to create interference.

In each subband, generate and transmit common message I using the remaining power after the private symbols and common messages II.

Invented Scheme in Practical Deployment

Wideband PMI with/without All-subband PMI

FIG. 6 illustrates CSIT pattern with wideband PMI only.

When there is only wideband PMI reported by both users, the qualities of the CSIT in all the subbands are the same for each user. As shown in FIG. 7, $\alpha_w = a_{(1:L)}$ and $\beta_w = b_{(1:L)}$ respectively represent the CSIT qualities of user 1 and user 2 in all the subbands. But note that $\alpha_w$ is not necessarily equal to $\beta_w$ due to the difference between the locations of the two users.

FIG. 7 illustrates CSIT pattern with wideband PMI and all-subband PMI.

When all-subband PMI is fed back by both users, a similar CSIT quality pattern, $\alpha_{as} = a_{(1:L)}$ and $\beta_{as} = b_{(1:L)}$ happens as shown in FIG. 8. Note that $\alpha_{as} > \alpha_w$ and $\beta_{as} > \beta_w$ since the subband PMI enhances the quality of the CSIT in each subband.

For convenience, we employ the notation $\alpha = a_{(1:L)}$ and $\beta = b_{(1:L)}$ to present the CSIT qualities of user 1 and user 2 respectively as they generalize the scenario shown in FIGS. 6 and 7. Without the loss of generality, we assume $\alpha \geq \beta$. Following the idea described before, an equivalent scenario with $\alpha' = a_{(1:L)}$; and $\beta = b_{(1:L)}$ is established. Afterwards, following the footsteps expressed before, the transmission block is constructed. The invented scheme transmits the signal in each subband same as that in [PIMRC2013](C. Hao and B. Clerckx, "MISO Broadcast Channel with Imperfect and (Un)matched CSIT in the Frequency Domain: DoF Region and Transmission Strategies," to be published in PIMRC 2013.), by superposing a common message I with ZFBF-precoded private messages and writes as Math Figure 18.

MathFigure 18

$$x_j = [c_j, 0]^T + \hat{g}_j^\perp u_j + \hat{h}_j^\perp v_j \qquad [\text{Math.18}]$$

The power allocated to $c_j$ is $P - P^\beta$ and the power allocated to $u_j$ and $v_j$ are both $P^\beta/2$. Consequently, the received signal at each user is expressed as Math Figure 19.

MathFigure 19

$$y_j = \underbrace{h_{j1}^* c_j}_{P} + \underbrace{h_j^H \hat{g}_j^\perp u_j}_{P^\beta/2} + \underbrace{h_j^H \hat{h}_j^\perp v_j}_{P - \alpha P^\beta \leq P^0} + \underbrace{\epsilon_{j1}}_{P^0}, \qquad [\text{Math. 19}]$$

$$z_j = \underbrace{g_{j1}^* c_j}_{P} + \underbrace{g_j^H \hat{g}_j^\perp u_j}_{P^0} + \underbrace{g_j^H \hat{h}_j^\perp v_j}_{P^\beta/2} + \underbrace{\epsilon_{j2}}_{P^0}$$

Where the private symbols $u_1$ and $v_1$ are drowned by the noise respectively at user 2 and user 1 due to ZFBF. Both users decode the common message first with rate $(1-\beta)\log P$ by treating the private message as noise. Afterwards, using SIC, each user can decode their private messages with rate 13 log P only subject to noise, after removing the common message I. The DoF pairs $(1,\beta)$ and $(\beta,1)$ are achieved if we consider the common message I is intended for user 1 and user 2 respectively.

However, recall that in Part 1, by performing ZFBF, the received signals at user 1 and user 2 write as Math Figure 20.

MathFigure 20

$$y_1 = h_1^H \hat{g}_1^\perp u_1 + h_1^H \hat{h}_1^\perp v_1 + \epsilon_{11}$$

$$z_1 = g_1^H \hat{g}_1^\perp u_1 + g_1^H \hat{h}_1^\perp v_1 + \epsilon_{12}$$

When the transmitter schedules two users in the subbands with only wideband PMI or all-subband PMI of both users, the scenario can be interpreted as $\alpha = a_{(1:L)}$ and $\beta = b_{(1:L)}$ ($\alpha$ and $\beta$ can be arbitrary values within 0 and 1).

Compared to ZFBF (MU-MIMO transmission in LTE), the invented scheme transmits one private symbol per user together with a common message I.

Compared to the scheme proposed in [PIMRC2013], the invented scheme considers a scenario with general value of the CSIT qualities of the two users (namely, $a_j$ is not necessarily equal to $b_j$). The power allocated to the private symbols and common message I are according to the minimum CSIT qualities between the two users.

Selected-subband PMI with/without wideband PMI

FIG. 8 illustrates The CSIT quality pattern in the scenario with selected-subband PMI and wideband PMI, where
$a_4 < a_1 < a_2 < a_3 = a_L$
and
$b_4 < b_2 < b_3 < b_1 = b_L$.

In the PMI feedback mode with user-selected subband PMI, each user evaluates the channel condition on each subband at each transmission slot. Then, each user selects a group of subbands with good conditions and reports the subband PMI on each of them. For convenience, we denote the PMI on subband j as $PMI_j$. To be specific, as shown in FIG. 9, user 1 reports $PMI_1$ and $PMI_2$ in slot 1 and 2 respectively and report $PMI_3$ and $PMI_L$ in slot 3; user 2 reports $PMI_2$ and $PMI_3$ in slot 1 and 2 respectively and report $PMI_1$ and $PMI_L$ in slot 3.

At a given transmission slot t, the quality of the CSIT in subband j is evaluated according to the wideband PMI and the $PMI_j$ from slot 1 to t. Due to the time-varying nature of the wireless channel, the selected subband PMI may vary across the time line. Accordingly, the CSIT in the subband with more recent subband PMI is likely to have a higher quality. For the subband without subband PMI from slot 1 to t, the CSIT quality is measured by the wideband PMI. If there is no wideband PMI feedback, the qualities of the CSIT in those subbands are 0.

Consequently, this PMI report mechanism leads to a more general CSIT quality pattern as shown in FIG. 9. Let us focus on user 1 for instance, at time slot 3, with $PMI_3$ and $PMI_L$, the CSIT in subband 3 and L is said to have the highest qualities among all the subbands. As PMI_2 is fed back in slot 2, the CSIT in subband 3 and L has the quality next to the CSIT in subband 3 and L. Similarly, we have $a_4 < a_1 < a_2 < a_3 = a_L$
and $b_4 < b_2 < b_3 < b_1 = b_L$.

If the transmitter schedules two users in subband 1 and 2, with $a_1 > b_1$, $a_2 < b_2$ and $a_1 + a_2 \geq b_1 + b_2$, the invented transmission scheme is constructed by first finding an equivalent scenario that $a_1' + a_2' = b_1 + b_2$ and secondly generating the common messages I, II and ZFBF-precoded private messages following the steps given above.

FIG. 9 illustrates Transferring the scenario with
$a_1 + a_2 \geq b_1 + b_2$
to the case
$a_1' + a_2' \geq b_1 + b_2$ FIG. 9 gives the illustration of two equivalent models.

Fix $a_2' = a_2$ and replace $a_1' = b_1 + b_2 - a_2$, such that the rate of $v_1$ decrease to $a_1'$log P and $u_0$ is generated with rate $q_2^-$ log P.

Fix $a_1' = a_1$ and replace $a_2' = b_1 + b_2 - a_1$, such that the rate of $v_2$ decrease to $a_2'$log P and $u_0$ is generated with rate $q_1^+$ log P.

For both cases, the transmitted signals write as Math Figure 21.

MathFigure 21

$$x_1 = [c_1, 0]^T + \hat{g}_1^\perp u_1 + [u_0, 0]^T + \hat{h}_1^\perp v_1$$

$$x_2 = [c_2, 0]^T + \hat{h}_2^\perp v_2 + [u_0, 0]^T + \hat{g}_2^\perp u_2 \qquad \text{[Math.21]}$$

TABLE 3

| Option 1 | subband 1 | Power | Rate (logP) | subband 2 | Power | Rate (logP) |
|---|---|---|---|---|---|---|
| | $c_1$ | $P - P^{q_2^- + b_1}$ | $1 - q_2^- - b_1$ | $c_2$ | $P - P^{b_2}$ | $1 - b_2$ |
| | $u_1$ | $P^{b_1}/2$ | $b_1$ | $u_2$ | $P^{b_2}/2$ | $b_2$ |
| | $v_1$ | $P^{q_2^- + b_1}/2$ | $q_2^- + b_1$ | $v_2$ | $P^{a_2}/2$ | $a_2$ |
| | $u_0$ | $P^{q_2^- + b_1}/2 - P^{b_1}/2$ | $q_2^-$ | $u_0$ | $P^{b_2}/2 - P^{a_2}/2$ | $q_2^-$ |
| Option 2 | subband 1 | Power | Rate (logP) | subband 2 | Power | Rate (logP) |
| | $c_1$ | $P - P^{a_1}$ | $1 - a_1$ | $c_2$ | $P - P^{q_1^+ + a_2}$ | $1 - q_1^+ - a_2$ |
| | $u_1$ | $P^{b_1}/2$ | $b_1$ | $u_2$ | $P^{b_2}/2$ | $b_2$ |
| | $v_1$ | $P^{a_1}/2$ | $a_1$ | $v_2$ | $P^{b_2 - q_1^+}/2$ | $b_2 - q_1^+$ |
| | $u_0$ | $P^{a_1}/2 - P^{b_1}/2$ | $q_1^+$ | $u_0$ | $P^{b_2}/2 - P^{b_2 - q_1^+}/2$ | $q_1^+$ |

The rate and power allocation are shown in Table 3. The first power and rate allocation policy results in the received signals at each user as Math Figure 22.

MathFigure 22

$$y_1 = \frac{h_{11}^* c_1}{P} + \frac{h_1^H \hat{g}_1^\perp u_1}{P^{b_1}} + \frac{h_{11}^* u_0}{P^{q_2^- + b_1}} + \frac{h_1^H \hat{h}_1^\perp v_1}{P^{q_2^- + b_1} P^{-a_1} < P^0} + \epsilon_{11} \qquad \text{[Math. 22]}$$

$$z_1 = \frac{g_{11}^* c_1}{P} + \frac{g_1^H \hat{g}_1^\perp u_1}{P^0} + \frac{g_{11}^* u_0}{P^{q_2^- + b_1}} + \frac{g_1^H \hat{h}_1^\perp v_1}{P^{q_2^- + b_1}} + \epsilon_{12}$$

$$y_2 = \frac{h_{21}^* c_2}{P} + \frac{h_2^H \hat{h}_2^\perp v_2}{P^0} + \frac{h_{21}^* u_0}{P^{b_2}} + \frac{h_2^H \hat{g}_2^\perp u_2}{P^{b_2}} + \epsilon_{21}$$

$$z_2 = \frac{g_{21}^* c_2}{P} + \frac{g_2^H \hat{h}_2^\perp v_2}{P^{a_2}} + \frac{g_{21}^* u_0}{P^{b_2}} + \frac{g_2^H \hat{g}_2^\perp u_2}{P^0} + \epsilon_{22}$$

Using the decoding procedure given before, the DoF pair $(1, (a_1+a_2)/2)$ and $((a_1+a_2)/2, 1)$ are achieved if we consider the common messages are intended for user 1 and user 2 respectively.

Note that the two-subband transmission strategy degrades to the schemes proposed in literature [Elia13a](J. Chen and P. Elia, "Optimal dof region of the two-user miso-bc with general alternating csit," available on arXiv:1303.4352, 2013.) if $a_1=b_2=\beta$ and $a_2=b_1=\alpha$. Moreover, it will become the $S_3^{3/2}$ scheme if $a_1=b_2=1$ and $a_2=b_1=0$.

If the transmitter schedules two users in subband 1, 2 and 3, the transmission scheme can be designed as the 3-subband example given before. Similarly, the transmission block for more than three subband case can be obtained.

The scenario with user-selected subband PMI can be interpreted as the general CSIT quality pattern with varying $(a_j,b_j)$ in all subbands.

At a given time slot, the quality of the CSIT in each subband of each user can be computed based on the wideband PMI and all the previous subband PMI.

The invented scheme in this case generally comprises common messages I, II and ZFBF-precoded private symbols. The number of each type of symbols, the rate and power allocated to them depends on the CSIT quality patterns. For two-subband case, the invented scheme considers a more general case (namely $a_e$ is not necessarily equal to $b_e$) than that in [Elia13a] and [Tandon2012](R. Tandon, S. Jafar, S. Shamai Shitz, and H. Poor, "On the synergistic benefits of alternating csit for the miso broadcast channel," IEEE Trans. Inf. Theory., vol. 59, no. 7, pp. 4106-4128, 2013.). For the scenario with more than 3 subbands, the invented scheme provides a general way in generating and transmitting multiple common messages II.

Switching Among Sub-Optimal Schemes

For a given CSIT quality pattern, especially the scenario with user-selected subband PMI, the invented scheme transmits a superposing of common messages I, II and private symbols. This requires a higher complexity in constructing the transmission block and decoding. To reduce the implementation complexity, simple suboptimal strategies can be employed if a satisfying DoF performance is achieved.

Let us consider a 3-subband scenario with user-selected subband PMI as example. As shown in FIG. 9, from subband 1 to 3, the CSIT qualities of user 1 satisfy $a_1 < a_2 < a_3$ according to the subband PMI report mode. Similarly for user2, the CSIT qualities satisfy $b_3 < b_1 < b_2$. Moreover, we assume $a_1=b_3$, $a_2=b_1$ and $a_3=b_2$. Hence, the CSIT qualities of user 2 are a permutation of that of user 1.

Suboptimal Schemes

In this scenario, the sum DoF performance of the invented scheme is
$d_\Sigma^S = 1 + (a_1+a_2+a_3)/3$.

The candidate sub-optimal schemes considered are single-user transmission (FDMA), MU-MIMO transmission (ZFBF) and an extended $S_3^{3/2}$ scheme. The sum DoF performance of them are summarized as follows.

FDMA: The sum DoF is
$d_\Sigma^F = 1$.

ZFBF: The sum DoF performance is
$d_\Sigma^Z = 2 \times (a_1+a_2+a_3)/3$
because $a_1=b_3$, $a_2=b_1$ and $a_3=b_2$.

Extended S_3^(3/2) scheme: The sum DoF performance is
$d_\Sigma^S = 1 + a_3/3$.

In extended $S_3^{3/2}$ scheme, the transmitted signal in each subband contains a private symbol intended for the user with a lower CSIT quality; Besides, common messages II are transmitted. The transmission block writes as Math Figure 23.

MathFigure 23

$$x_1 = \underbrace{[u_0(1), 0]^T}_{P/2} + \underbrace{\hat{g}_1^\perp u_1}_{P/2} \quad \text{[Math. 23]}$$

$$x_2 = \underbrace{[u_0(2), 0]^T}_{P/2} + \underbrace{\hat{g}_2^\perp u_2}_{P/2}$$

$$x_3 = \underbrace{[u_0(2)+u_0(1), 0]^T}_{P/2} + \underbrace{\hat{h}_3^\perp v_3}_{P/2}$$

The received signals write as Math Figure 24.

MathFigure 24

$$y_1 = \underbrace{h_{11}^* u_0(1)}_{P} + \underbrace{h_1^H \hat{g}_1^\perp u_1}_{P} + \epsilon_{11}, \quad \text{[Math. 24]}$$

$$z_1 = \underbrace{g_{11}^* u_0(1)}_{P} + \underbrace{g_1^H \hat{g}_1^\perp u_1}_{P^{b_1} P=P^{1-b_1}} + \epsilon_{12}$$

$$y_2 = \underbrace{h_{21}^* u_0(2)}_{P} + \underbrace{h_2^H \hat{g}_2^\perp u_2}_{P} + \epsilon_{21},$$

$$z_2 = \underbrace{g_{21}^* u_0(2)}_{P} + \underbrace{g_2^H \hat{g}_2^\perp u_2}_{P^{-b_2} P=P^{1-b_2}} + \epsilon_{22}$$

$$y_3 = \underbrace{h_{31}^*(u_0(2)+u_0(1))}_{P} + \underbrace{h_3^H \hat{h}_3^\perp v_3}_{P^{-a_3} P=P^{1-a_3}} + \epsilon_{31},$$

$$z_3 = \underbrace{g_{31}^*(u_0(2)+u_0(1))}_{P} + \underbrace{g_3^H \hat{h}_3^\perp v_3}_{P} + \epsilon_{32}$$

As the symbols sent in each subband via SC, SIC is the main technique used in decoding. Similar to the invented scheme, user 1 starts with decoding $u_0(1)$ and $u_0(2)$ from the received signal in subband 3 by treating $h_3^H \widehat{h}_3^\perp v_3$ as noise. Afterwards, with the knowledge of the common messages II, the private symbols, $u_1$ and $u_1$ are recovered from the received signals in subband 1 and 2 respectively. Similarly, user 2 decodes $u_0(1)$ and $u_0(2)$ respectively from $z_1$ and $z_1$ by treating $g_1^H \widehat{g}_1^\perp u_1$ and $g_2^H \widehat{g}_2^\perp u_2$ as noise. After that, using SIC, the private symbol $v_3$ is recovered from $z_3$.

Consequently, user 1 decodes $u_0(1)$ and $u_0(2)$ with the sum rate of $a_3 \log P$ (as $u_0(1)$ and $u_0(2)$ are superposed, the sum rate of the them does not change with the power allocated to each of them. They well be decoded using SIC.) by treating $h_3^H \widehat{h}_3^\perp v_3$ as noise. However, user 2 recovers $u_0(1)$ and $u_0(2)$ respectively with rate $b_1 \log P$ and $b_2 \log P$ by treating $g_1^H \widehat{g}_1^\perp u_1$ and $g_2^H \widehat{g}_2^\perp u_2$ as noise. The sum rate of the common messages II should be $\min(b_1+b_2,a_3) \log P = \min(a_2+a_3,a_3)\log P = a_3 \log P$. Each of the private symbols is decoded with the rate $\log P$. In this way, the sum DoF is computed as $$d_\Sigma^S = \frac{3+a_3}{3} = 1 + \frac{a_3}{3}.$$

Switching among the sub-optimal schemes

In each figure presented below, we take the max sum DoF performance over the aforementioned sub-optimal strategies for all possible values of $a_1$, $a_2$ and $a_3$. If the max sum DoF can achieve at least ρ (expressed in %) of the optimal result, the complicated optimal strategy is replaced by the sub-optimal one.

FIG. 10 illustrates switch among FDMA, ZFBF and Extended $S_3^{3/2}$ scheme in the scenario with user-selected subband PMI and wideband PMI, targeting at achieving 90% of the optimal DoF performance.

In FIG. 10, nearly an half of the $(a_1, a_2, a_3)$-grid is covered by the invented scheme when ρ=90%. ZFBF has distinguished performance all of $a_1$, $a_2$ and $a_3$ approach to 1, because the CSIT works well in rejecting the interference potentially overheard by both users. The extended $S_3^{3/2}$ scheme occupies the corners where only one of $a_1$, $a_2$ and $a_3$ is large. FDMA can achieve above 90% of the optimal sum DoF performance when all of $a_1$, $a_2$ and $a_3$ are small.

FIG. 11 illustrates Switch among FDMA, ZFBF and the Extended $S_3^{3/2}$ scheme in the scenario with user-selected subband PMI and wideband PMI, targeting at achieving 75% of the optimal DoF performance.

FIG. 11 displays an interesting result, namely that the best transmission strategy out of three covers all the possible tuples of $a_1$, $a_2$ and $a_3$ when the target is decreased to 75%. In other words, the best strategy among the 3 sub-optimal strategies can achieve at least 75% of the optimal sum DoF performance as Math Figure 25.

MathFigure 25

$$\max(d_\Sigma^F, d_\Sigma^Z, d_\Sigma^S) \geq 75\% \; d_\Sigma^{opt}, \forall (a_1, a_2, a_3) \in [0,1] \quad [\text{Math.25}]$$

For any CSIT quality pattern or PMI report mode (number of subbands, arbitrary values of CSIT qualities of the two users and among all the subbands), the invented scheme can be replaced with any low-complexity sub-optimal strategies if the sub-optimal schemes achieve a satisfying level (namely, 80%) of the DoF performance achieved by the invented scheme.

The transmitter needs to compute the DoF performance resulted by the candidate sub-optimal schemes according to the CSIT quality pattern. Then the transmitter decides which transmission mode to be performed and inform the users.

When switching among the sub-optimal schemes in an L-subband scenario, the transmitter can consider employing different sub-optimal schemes in different group of subbands. For instance, in a 3-subband scenario with $a_1 = b_1$, $a_2 > b_2$ and $a_3 < b_3$, the transmitter can consider performing ZFBF in subband 1 and $S_3^{3/2}$ scheme in subband 2 and 3.

The sub-optimal schemes can be any simplified version of the invented scheme. Specifically, if only common message I is sent in each subband, the transmission degrades to single-user mode (FDMA); if only private symbols are sent, the transmission becomes conventional MU-MIMO (ZFBF); if common messages II and private symbols are sent with full power in any of the subbands with unequal CSIT qualities of the two users, the scheme turns to extended $S_3^{3/2}$ scheme. (Note that this differs from $S_3^{3/2}$ scheme by considering multiple-subband transmission, i.e. L≥3, and transmitting multiple common messages II in each subband.)

The invented scheme can be completely replaced with the sub-optimal schemes if the targeting achievement is low, as shown in FIG. 11.

Signaling mechanisms to operate the transmission strategies

CSIT Pattern Feedback:

For a given feedback report mode (e.g. on PUCCH or PUSCH in LTE-A) decided by the BS, a UE computes (given its channel estimation implementation and CSI feedback mechanism) the statistical CSIT accuracy for one or several subbands and reports it to the BS.

In PUCCH report with wideband PMI (PUCCH 1-1-1 and PUCCH 1-1-2) and in the PUSCH reports with wideband PMI (PUSCH 3-1) and with subband PMI report for all subbands (PUSCH 3-2 and PUSCH 1-2), in order to reduce the feedback overhead, each user reports a single value of the CSI accuracy as it is assumed the same across all subbands. This value refers to $\alpha = a_{(1:L)}$ (similarly to the notations used in previous section). The value is quantized using a codebook.

For reports where one or several subband CSI is reported (but not all), one or several estimates of the CSIT accuracies are reported.

Based on the collection of those CSIT accuracies from all users in all subbands, the BS performs user selection and scheduling and decides upon the appropriate transmission strategy (including the invented scheme and the sub-optimal candidates discussed before).

Transmission mode indication: A new DCI format is needed to indicate the user the proper transmission mode and the relevant information required for demodulation. In particular, the receiver needs to be informed about the size of the transmission block (as it depends on the CSI accuracy and the CSIT pattern of the co-scheduled users), the kinds of messages (common message I, common message II and private message), and the number of messages, the modulation and coding scheme of all common messages and private message intended for the user, information about whether common message is intended for the user or not, the transmit power of each message.

The new transmission strategy needs to be known by both the BS and the UE, i.e. for a given CSIT pattern, the UEs and BS need to be synchronized such that they both assume the same transmission strategy. A table of possible candidates transmission strategies (subset strategies of the general framework developed in previous sections) could be made available at both the UE and BS and the index of the strategy indicated by the BS to the UE. For each candidate strategy, the kinds and number of message is defined along with the power allocation for each message. The BS indicates in the DL the index of the transmission strategy along with the modulation and coding scheme for each relevant message.

FIG. 12 illustrates an example transmitter and receiver according to this invention.

As shown in FIG. 12, the transmitter 1200 includes a controller 1210 and transceiver 1220. The controller is configured for determining a transmit power and a transmission rate based on the CSI qualities of the plural receivers calculated from the each CSI and for transmitting the signal using the transmit power and the transmission rate. The signal comprises the private message, the common message I and the common message II. The transceiver transmits and receives the signals. The receiver 1230 includes a controller 1250 and a transceiver 1240. The controller is configured for receiving the signals transmitted from the transmitter. The transceiver transmits and receives the signals.

Although FIG. 12 illustrates one example of transmitter and receiver, various changes may be made to FIG. 11. For example, various components in FIG. 11 could be combined, further subdivided, or omitted and additional components could be added according to particular needs.

The invention claimed is:

1. A method for transmitting a signal based on channel state information (CSI) qualities of a plurality of receivers, the method comprising:
    receiving each CSI from the plurality of receivers;
    determining a transmit power and a transmission rate based on the CSI qualities of the plurality of receivers calculated from the each CSI; and
    transmitting the signal using the transmit power and the transmission rate, the signal comprising a user specific message, a first common message and a second common message,
    wherein the first common message is transmitted to the plurality of receivers using the transmit power and the transmission rate determined by a maximum CSI quality of a receiver among the plurality of receivers to compensate a difference between a perfect CSI quality and the maximum CSI quality of the receiver among the plurality of receivers.

2. The method of claim 1, wherein the user specific message is transmitted to a specific receiver using the transmit power and the transmission rate determined by a CSI quality of the specific receiver.

3. A transmitter apparatus for transmitting a signal based on channel state information (CSI) qualities of a plurality of receivers, the apparatus comprising:
    a transceiver configured to transmit and receive signals to and from the plurality of receivers; and
    a controller configured to:
        receive each CSI from the plurality of receivers,
        determine a transmit power and a transmission rate based on the CSI qualities of the plurality of receivers calculated from the each CSI, and
        transmit the signal using the transmit power and the transmission rate, the signal comprising a user specific message, a first common message and a second common message,
    wherein the controller is further configured to transmit the first common message to the plurality of receivers using the transmit power and the transmission rate determined by a maximum CSI quality of a receiver among the plurality of receivers to compensate a difference between a perfect CSI quality and the maximum CSI quality of the receiver among the plurality of receivers.

4. The apparatus of claim 3, wherein the controller is further configured for transmitting the user specific message to a specific receiver using the transmit power and the transmission rate determined by a CSI quality of the specific receiver.

* * * * *